US009761989B2

(12) United States Patent
Blair

(10) Patent No.: US 9,761,989 B2
(45) Date of Patent: Sep. 12, 2017

(54) PANEL WITH CONNECTOR AND SECURED PROTECTIVE COVER

(71) Applicant: Saint Technologies, Inc., Shannon, IL (US)

(72) Inventor: James F. L. Blair, Pearl City, IL (US)

(73) Assignee: Saint Technologies, Inc., Shannon, IL (US)

( * ) Notice: Subject to any disclaimer, the term of this patent is extended or adjusted under 35 U.S.C. 154(b) by 96 days.

(21) Appl. No.: 15/006,731

(22) Filed: Jan. 26, 2016

(65) Prior Publication Data

US 2017/0214173 A1 Jul. 27, 2017

(51) Int. Cl.
*F16B 39/32* (2006.01)
*H01R 13/52* (2006.01)

(52) U.S. Cl.
CPC ................................ *H01R 13/5213* (2013.01)

(58) Field of Classification Search
CPC ............................ H01R 13/5213; H01R 13/52
USPC ................... 411/125, 372.5, 372.6, 374, 999
See application file for complete search history.

(56) References Cited

U.S. PATENT DOCUMENTS 3,129,993 A * 4/1964 Ross ...................... H01R 13/64 285/360
4,421,369 A * 12/1983 Myking ................. H01R 24/20 439/135
5,006,078 A * 4/1991 Crandall ............ H01R 13/5213 439/521
5,562,378 A 10/1996 Bleschschmidt et al.
5,588,853 A * 12/1996 Anthony ............ H01R 13/5213 220/375
5,681,136 A 10/1997 Blair
5,993,266 A * 11/1999 Mayer ................ H01R 13/5213 439/294
6,142,805 A * 11/2000 Gray .................. H01R 13/5221 439/135
7,632,141 B2 * 12/2009 Malak ................ H01R 13/5219 439/271
7,914,306 B1 * 3/2011 Blackwell .......... H01R 13/5213 439/135
8,186,919 B2 5/2012 Blair
9,279,944 B1 * 3/2016 Miller .................. G02B 6/3849
2005/0153591 A1 * 7/2005 Milner ............... H01R 13/5213 439/321
2009/0163058 A1 * 6/2009 Craig .................. H01R 13/447 439/147

* cited by examiner

*Primary Examiner* — Gary Estremsky
(74) *Attorney, Agent, or Firm* — Wood, Phillips, Katz, Clark & Mortimer

(57) ABSTRACT

A connector secured to a panel and connectable to a circuit terminal. The connector extends through a panel opening with a flange abutting the panel rear and a front portion with a connecting terminal projecting from the panel front. A lock washer around the connector front portion includes a planar washer body and integral lock tabs radially outward of its central aperture. A securing tab extends radially from the washer body and is bent away from the panel front face. A nut is secured to the connector outer thread over the lock washer. A protective cover is selectively securable over the connector front portion by threading on the connector outer thread, and a lanyard secures the protective cover to the lock washer securing tab.

4 Claims, 3 Drawing Sheets

PANEL WITH CONNECTOR AND SECURED PROTECTIVE COVER

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

The present invention relates to connection terminals secured to a panel, and more particularly to connection terminals which are protected when disconnected.

BACKGROUND

Electrical connectors are commonly secured to a housing, such as by securing to a panel of the housing. For example, as illustrated in FIGS. 1-4 and particularly FIG. 3, a housing panel 10 may have an opening through which the connector 12 extends, with the connector having a flange 14 (which can be a nut) abutting one side of the panel opening and a nut 16 secured to an outer thread 18 on the connector 12 and abutting the other side of the panel opening.

During normal operation, the connector 12 would be connected to a mating connector terminal. However, during a typical life of such a connector 12, the connector 12 will be periodically disconnected from the mating terminal, for example during service or when a change of design occurs. In order to protect the terminal portion of the connector 12 when it is disconnected and therefore exposed, a protective dust cap 20 has heretofore been placed over the exposed connector terminal end, with the cap 20 secured thereon by screwing its internal thread 22 onto the connector outer thread 18.

In order to ensure that such a protective cap 20 is available at all times when needed, in some instances the cap 20 has been secured to a lanyard 24 which is also secured to a ring 26 (see FIGS. 2 and 4) which is secured over the connector 12, for example between the nut 16 and the front face of the flange 14. Thus, cap 20 is secured in the location even when not being used (e.g., when the connector 12 is connected to the mating terminal) so that it can readily be secured over the connector terminal end when the connector 12 is disconnected, for example, during service.

Such connectors 12 typically have just enough outer threads 18 to allow the ring 26 to be so mounted. Thus, as illustrated in FIG. 4, when the ring 26 is used, the portion of the outer thread 18 extending beyond the nut 16 of many connectors already in service is just enough to securely retain the cap 20 thereon.

In many such installations, it is also necessary to ensure that the connector 12 will remain securely in place, without the nut 16 loosening. In order to ensure this, safety wires have been used. Such safety wires have been, for example, stainless steel wires which are on one end secured to the nut 16 and on the other end are secured to some structure to prevent rotation of the nut 16. For example, the stainless steel wire is typically threaded through a hole in the nut 26 on its one end, and then looped and twisted around itself to close a loop. The wire other end has been secured to the panel or structure attached to the panel, or even threaded through the panel opening and secured to the flange or nut on the other side of the panel 10.

Installation of such safety wires is difficult and time consuming. For example, after it is installed, a second installer must inspect the installation to ensure, for example, that the wire is properly installed, including the proper number of twists per inch, installed in the proper direction (opposite of thread direction), and has no nicks on the wire which could cause breakage. Further, the ends of the wire are also supposed to be cut and twisted toward the panel, which can be difficult if not impossible in crowded blind areas which are difficult to access. Moreover, such cuts and twists put stress on the wire which can result in breakage. Still further, even when properly installed the wire cuts result in very sharp points on which the installer can cut himself and leave blood in the area, can snag on protective clothing and endanger workers requiring such clothing, cause mechanical problems such as jamming, and/or cause electrical shorting.

As a result of such problems, most military applications will no longer allow such safety wires.

The present improvement is intended to overcome such problems.

SUMMARY

In one aspect of the present invention, a connector is secured to a panel and connectable to a circuit terminal. The panel has a front face and a rear face with an opening therethrough. The connector extends through the panel opening with a flange abutting the panel rear face and a front portion projecting from the panel front face, with the connector front portion having an outer thread and at least one connecting terminal exposed at a front end and adapted to connect to the circuit terminal. A lock washer is around the connector front portion adjacent the panel front face, and includes a planar washer body formed of a sheet of resilient metal with a central aperture and a selected thickness between top and bottom surfaces, first and second lock tabs integral with the body radially outward of the central aperture, and a securing tab extending radially from the washer body and bent from the plane of the body away from the panel front face. A nut is secured to the connector outer thread with the lock washer between the nut and the panel front face. A protective cover is selectively securable over the connector front portion by threading on the connector outer thread. A lanyard secures the protective cover to the lock washer securing tab.

In one form of this aspect of the invention, the nut has a maximum outer radius $R_{MAX}$ and the securing tab is bent at a radius greater than $R_{MAX}$.

In another form of this aspect of the invention, the lock washer includes a radially inward facing, straight, free edge transverse to a radius of the body, and a spring bend biasing the tab to a displaced position in which the tab is bent to one side of the plane of the body to provide a selected spring force adapted to allow the lock tabs to be pushed down to a coplanar position with the washer body.

In still another form of this aspect of the invention, the lock tabs and free edge are defined by notches.

Other features and advantages will become apparent from a review of the entire specification, including the appended claims and drawings.

DETAILED DESCRIPTION

Figure 1:
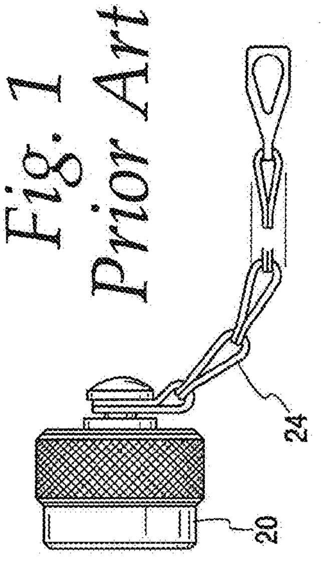
Fig. 1 Prior Art
FIGS. 1-4 illustrate prior art panel mounted connectors and protective caps.
Figure 2:
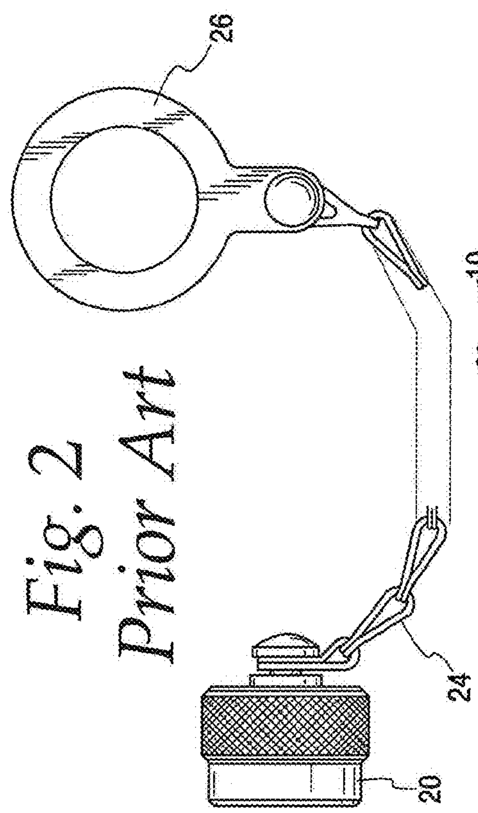
Fig. 2 Prior Art
Figure 3:
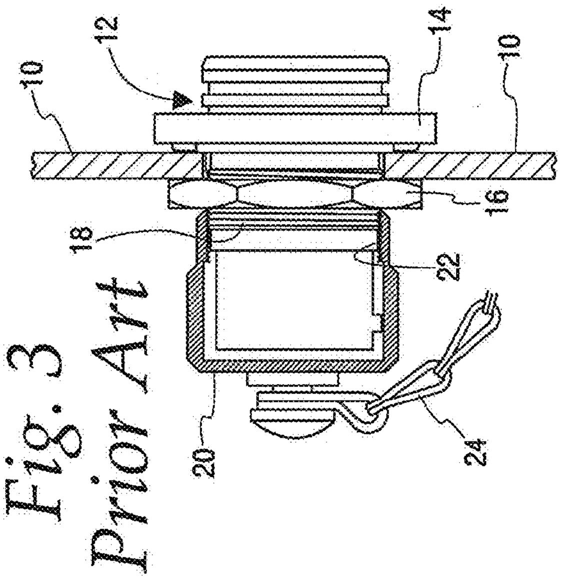
Fig. 3 Prior Art
Figure 4:
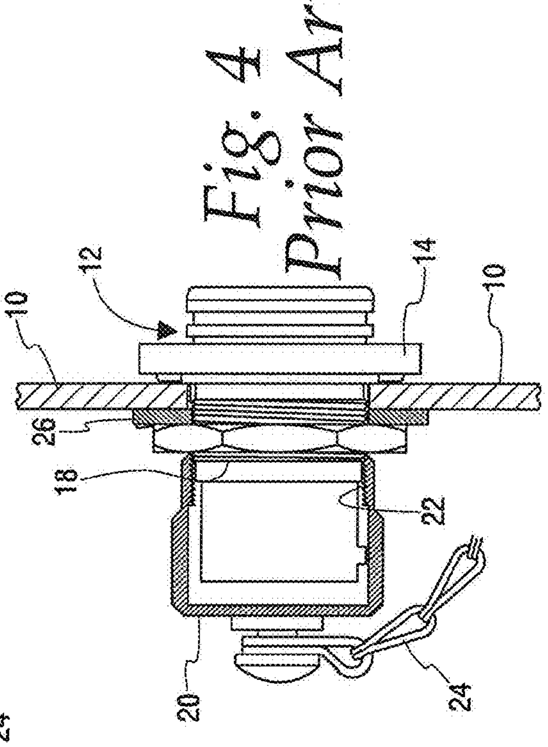
Fig. 4 Prior Art
Figure 7:
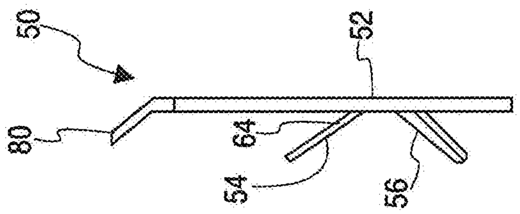
FIG. 7 is a side of the Fig. lock washer.
Figure 6:
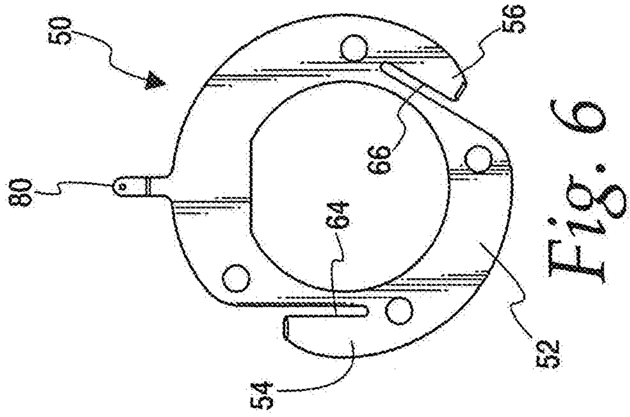
FIG. 6 is a plan view of a lock washer according to the present invention.

FIGS. 5-10 illustrate one embodiment of the present invention, providing a panel 10' with a securely and reliably mounted protectable connector 12'.

Specifically, the connector 12' is secured in an aperture of the panel 10' with a flange 14' abutting the rear side of the panel 10'. The flange 14' may be integral with the connector 12' and may include an O-ring 15 which seals around the panel aperture. A nut 16' is screwed onto the thread 18' on the forward portion of the connector 12' with a lock washer 50 between the nut 16' and the front face of the panel 10'.

The lock washer 50 may be particularly advantageous with a washer body 52 having lock tabs 54, 56 (see FIG. 6-7) such as disclosed in my U.S. Pat. No. 8,186,919, the full disclosure of which is hereby incorporated by reference. Specifically, in the illustrated advantageous embodiment, the tabs 54, 56 each have a straight free edge 64, 66 transverse (i.e., at 90 degrees) to a radius of the washer body 52 and include a spring bend at the connection to the washer body 52 to extend out of the plane of the washer body 52 (see particularly FIG. 7).

Figure 5:
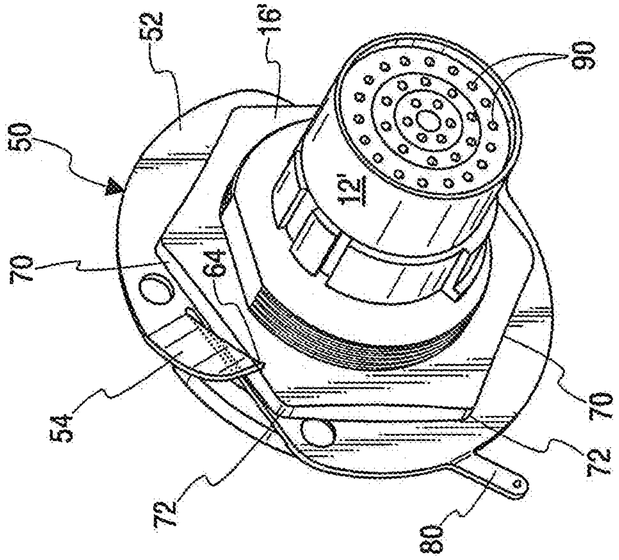
FIG. 5 is a perspective view of a panel mounted connector according to the present invention.
Figure 10:
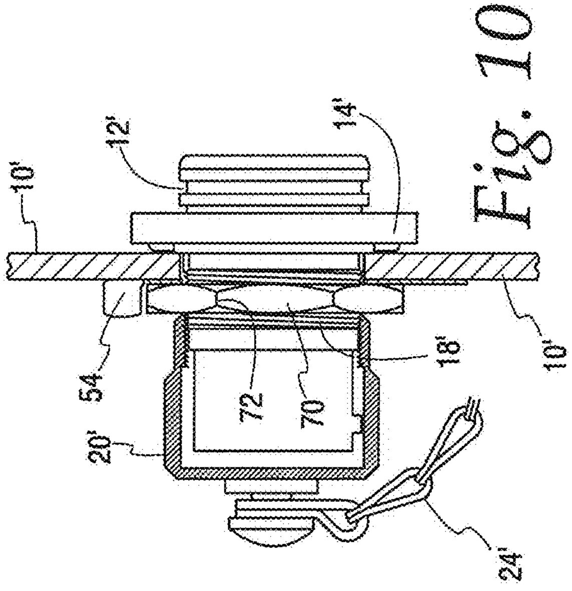
FIGS. 9-10 illustrate a panel mounted connector according to the present invention.
Figure 8:
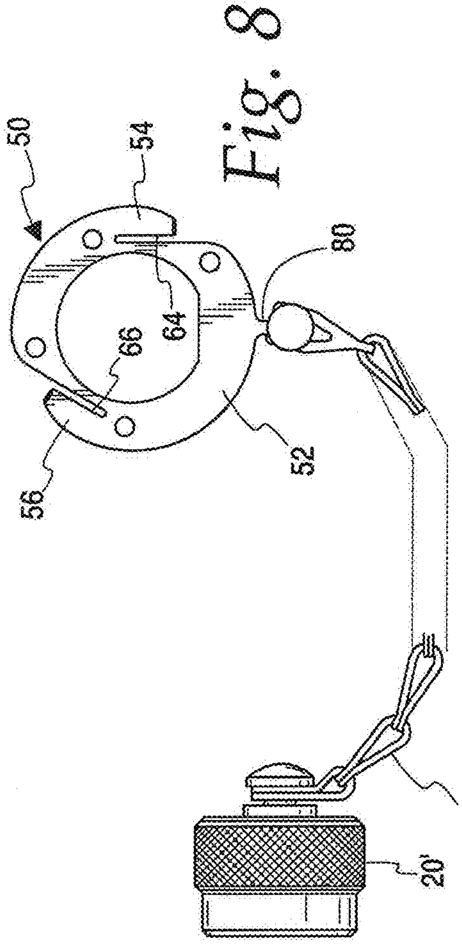
FIG. 8 illustrates a connected lock washer and protective cap according to the present invention.
Figure 9:
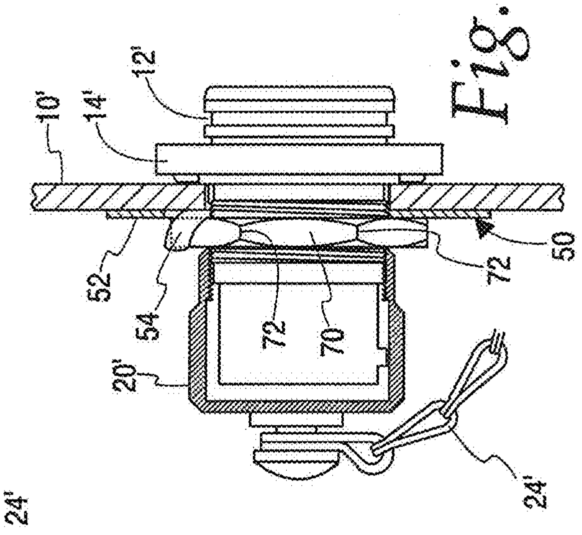

The free edges 64, 66 are radially spaced from the center of the washer body 52 a distance approximately equal to or just slightly greater than the distance from the center of the nut 16' to the nearest point on the flat 70 of the nut 16'. It should be appreciated that with the lock washer 50 between the panel 10' and the nut 16' when the nut 16' is rotated to tighten (e.g., counter-clockwise such as illustrated in FIG. 5), the nut points 72 will push lock washer tabs 54, 56 down to allow such rotation. However, at least one tab 54, 56 will spring up out of the plane of the washer body 52 and block the nut 16' from loosening (i.e., prevent clockwise rotation in FIG. 5) to maintain the nut 16' in its tightened position. If removal is desired, the maintenance person can use a wrench which will push the tabs 54, 56 down and out of the way to allow such loosening rotation.

An alternative lock washer configuration which may be used is disclosed in my U.S. Pat. No. 5,681,136, the full disclosure of which is also hereby incorporated by reference.

In accordance with the present invention, the lock washer 50 also includes a radially extending tab 80 which is also bent from the plane of the washer body 52. The bend is located at a radius from the central axis which is at least as great as the maximum outer radius $R_{MAX}$ of the nut 16' (i.e., the radius of the nut points 72) so that it may maintain its bent configuration at all times, including when the nut 16' is turned and the nut points 72 pass by the bend.

A lanyard 24' is secured on one end to the cap 20' and on the other end to the lock washer radially extending tab 80, so that the cap 20' may be reliably secured by the connector 12' whether the cap 20' is in use or not. That is, when not in use, the cap 20' will hang from the lanyard 24' by the connector 12'. When the connector 12' is disconnected from a mating connector so as to expose the terminals 90 of the connector 12' (e.g., female terminals 90 illustrated in FIG. 5), the cap 20' may be screwed onto the connector threads 18', where sufficient threads will be available for that purpose even in retrofitted connectors 12' having limited threads 18'. This may all be accomplished by very simple maintenance without the many disadvantages of a safety wire.

From the foregoing, it will be readily appreciated that the panel mounted connector of the present invention will may be easily, quickly, efficiently and reliably assembled. Moreover, over the course of its useful life, the connector will be positively locked in its mounted position while also allowing easy maintenance, including protecting the connector terminals during such maintenance.

The invention claimed is:

1. A connector secured to a panel and connectable to a circuit terminal, comprising:
- a panel having a front face and a rear face, said panel having an opening therethrough;
- a connector extending through said panel opening with a flange abutting the panel rear face and a front portion projecting from said panel front face, said connector front portion having
  - an outer thread, and
  - at least one connecting terminal exposed at a front end and adapted to connect to the circuit terminal;
- a lock washer around said connector front portion adjacent said panel front face, said lock washer including
  - a planar washer body formed of a sheet of resilient metal with a central aperture and a selected thickness between top and bottom surfaces,
  - first and second lock tabs integral with said body radially outward of said central aperture, and
  - a securing tab extending radially from the washer body and bent from the plane of the body away from said panel front face;
- a nut secured to said connector outer thread with said lock washer between said nut and said panel front face;
- a protective cover selectively securable over said connector front portion by threading on said connector outer thread; and
- a lanyard securing said protective cover to said lock washer securing tab.

2. The connector of claim 1, wherein said nut has a maximum outer radius $R_{MAX}$ and said securing tab is bent at a radius greater than $R_{MAX}$.

3. The connector of claim 1, wherein said lock washer includes:
- a radially inward facing, straight, free edge transverse to a radius of said body; and
- a spring bend biasing said tab to a displaced position in which the tab is bent to one side of the plane of said body to provide a selected spring force adapted to allow the lock tabs to be pushed down to a coplanar position with the washer body.

4. The connector of claim 1, wherein said lock tabs and free edge are defined by notches.

* * * * *